United States Patent
Hamad (10) Patent No.: US 9,297,285 B2
(45) Date of Patent: Mar. 29, 2016

(54) DIRECT DENSIFICATION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

(75) Inventor: Esam Zaki Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/980,596

(22) PCT Filed: Jan. 20, 2012

(86) PCT No.: PCT/US2012/022021
§ 371 (c)(1),
(2), (4) Date: Aug. 29, 2013

(87) PCT Pub. No.: WO2012/100157
PCT Pub. Date: Jul. 26, 2012

(65) Prior Publication Data
US 2013/0327024 A1 Dec. 12, 2013

Related U.S. Application Data

(60) Provisional application No. 61/434,641, filed on Jan. 20, 2011.

(51) Int. Cl.
*F01N 3/00* (2006.01)
*F01N 3/02* (2006.01)
(Continued)

(52) U.S. Cl.
CPC .............. *F01N 3/02* (2013.01); *B01D 53/002* (2013.01); *B01D 53/92* (2013.01); *F01N 3/04* (2013.01);
(Continued)

(58) Field of Classification Search
CPC ........ B01D 53/002; B01D 53/92; F01N 3/02; F01N 3/04
USPC ........................................... 60/274, 310, 324
See application file for complete search history.

(56) References Cited

U.S. PATENT DOCUMENTS

| | | |
|---|---|---|
| 3,658,043 A | 4/1972 | Hoffman |
| 3,828,552 A | 8/1974 | Nishiguchi |

(Continued)

FOREIGN PATENT DOCUMENTS

| | | |
|---|---|---|
| CN | 201196111 Y | 2/2009 |
| DE | 3437750 A1 | 5/1986 |

(Continued)

OTHER PUBLICATIONS

English translation of French Patent Application Publication No. FR 2875265A1 (Mar. 2006).*

(Continued)

*Primary Examiner* — Jason Shanske
(74) *Attorney, Agent, or Firm* — Abelman, Frayne & Schwab (57) ABSTRACT

A method and system are described for on-board treatment of an exhaust stream containing $CO_2$ emitted by a hydrocarbon-fueled internal combustion engine (ICE) used to power a vehicle in order to reduce the amount of $CO_2$ discharged into the atmosphere which include:

a. a first waste heat recovery zone on board the vehicle for receiving the high temperature exhaust gas stream in heat exchange relation and discharging the exhaust stream at a lower temperature,
the waste heat recovery zone further including at least one heat exchanger and/or heat recovery device with an inlet for receiving the hot exhaust gas stream from the ICE for passage in heat exchange relation and an outlet for the cooled exhaust gas stream,
the heat exchanger further including an inlet for receiving a heat exchange fluid at a first temperature and an outlet for discharging the fluid at a second higher temperature,
the heat recovery device including power transmission means;
b. a densification zone in fluid communication with the exhaust gas stream discharge outlet from the first waste heat recovery zone, the densification zone including means for reducing the temperature and volume of the $CO_2$ to at least liquefy the $CO_2$, and to produce a treated exhaust gas stream of reduced $CO_2$ content;
c. a separation zone in communication with the densification zone and having a discharge outlet for the treated exhaust stream;
d. storage zone for receiving the densified $CO_2$ for temporary storage on board the vehicle; and
e. an exhaust gas conduit in fluid communication with the treated exhaust gas stream outlet from the separation zone.

17 Claims, 5 Drawing Sheets

(51) Int. Cl.
 *B01D 53/00* (2006.01)
 *B01D 53/92* (2006.01)
 *F01N 3/04* (2006.01)

(52) U.S. Cl.
 CPC ..... *B01D 2257/504* (2013.01); *B01D 2258/012* (2013.01); *B01D 2258/014* (2013.01); *B01D 2259/65* (2013.01); *Y02E 20/185* (2013.01)

(56) References Cited

U.S. PATENT DOCUMENTS

| | | | |
|---|---|---|---|
| 3,909,206 A | 9/1975 | Katz | |
| 3,913,326 A | 10/1975 | Banks | |
| 3,932,987 A | 1/1976 | Munzinger | |
| 4,055,955 A | 11/1977 | Johnson | |
| 4,290,268 A * | 9/1981 | Lowther | 60/668 |
| 4,341,088 A | 7/1982 | Mei et al. | |
| 4,674,463 A | 6/1987 | Duckworth et al. | |
| 4,729,879 A | 3/1988 | Black | |
| 4,786,294 A | 11/1988 | Jonqueres et al. | |
| 4,810,266 A | 3/1989 | Zinnen | |
| 4,891,939 A | 1/1990 | Brighenti | |
| 4,899,544 A | 2/1990 | Boyd | |
| 5,076,055 A * | 12/1991 | Jubb | 60/279 |
| 5,100,635 A * | 3/1992 | Krishnamurthy et al. | 423/235 |
| 5,141,620 A | 8/1992 | Molter | |
| 5,233,837 A | 8/1993 | Callahan | |
| 5,272,891 A | 12/1993 | Erickson | |
| 5,281,254 A | 1/1994 | Birbara et al. | |
| 5,442,914 A | 8/1995 | Otsuka | |
| 5,467,722 A * | 11/1995 | Meratla | 110/345 |
| 5,515,691 A | 5/1996 | Wertenbach et al. | |
| 5,667,561 A | 9/1997 | Suzuki et al. | |
| 5,680,764 A | 10/1997 | Viteri | |
| 5,743,080 A | 4/1998 | Ginter | |
| 5,857,324 A | 1/1999 | Scappatura et al. | |
| 5,876,488 A | 3/1999 | Birbara et al. | |
| 6,079,373 A | 6/2000 | Kawamura | |
| 6,218,173 B1 | 4/2001 | Naito | |
| 6,220,019 B1 | 4/2001 | Sugiura et al. | |
| 6,263,659 B1 | 7/2001 | Dillon et al. | |
| 6,301,927 B1 | 10/2001 | Reddy | |
| 6,352,576 B1 | 3/2002 | Spencer et al. | |
| 6,374,630 B1 | 4/2002 | Jones | |
| 6,387,337 B1 | 5/2002 | Pennline et al. | |
| 6,582,498 B1 | 6/2003 | Sass et al. | |
| 6,591,614 B2 | 7/2003 | Smith et al. | |
| 6,598,398 B2 | 7/2003 | Viteri et al. | |
| 6,625,977 B2 | 9/2003 | Lehman | |
| 6,655,150 B1 | 12/2003 | Asen et al. | |
| 6,675,609 B2 | 1/2004 | Takeuchi et al. | |
| 6,712,879 B2 | 3/2004 | Kato et al. | |
| 6,764,530 B2 | 7/2004 | Iijima | |
| 6,866,702 B2 | 3/2005 | Mitsuda | |
| 6,889,512 B2 | 5/2005 | Ebara et al. | |
| 6,890,497 B2 | 5/2005 | Rau et al. | |
| 6,912,872 B2 | 7/2005 | Whitlock | |
| 6,925,821 B2 | 8/2005 | Sienel | |
| 7,055,333 B2 | 6/2006 | Leitch et al. | |
| 7,065,962 B2 | 6/2006 | Boncodin | |
| 7,067,456 B2 | 6/2006 | Fan et al. | |
| 7,073,348 B2 | 7/2006 | Clodic et al. | |
| 7,089,743 B2 | 8/2006 | Frutschi et al. | |
| 7,207,170 B2 | 4/2007 | Fukuma | |
| 7,250,150 B1 | 7/2007 | Keefer et al. | |
| 7,275,395 B1 | 10/2007 | Ventura | |
| 7,290,504 B2 | 11/2007 | Lange | |
| 7,326,280 B2 | 2/2008 | Hrycak et al. | |
| 7,390,444 B2 | 6/2008 | Ramme et al. | |
| 7,444,812 B2 | 11/2008 | Kirkpatirck et al. | |
| 7,618,606 B2 | 11/2009 | Fan et al. | |
| 7,621,980 B2 | 11/2009 | Saito et al. | |
| 2003/0053942 A1 | 3/2003 | Fernandez | |
| 2004/0074235 A1 | 4/2004 | Lampkin et al. | |
| 2004/0128975 A1 | 7/2004 | Viteri | |
| 2004/0187486 A1 * | 9/2004 | Ieda | 60/324 |
| 2005/0115230 A1 | 6/2005 | Shi | |
| 2005/0172631 A1 * | 8/2005 | Primlani | 60/698 |
| 2005/0193962 A1 | 9/2005 | Mariscal Munoz | |
| 2006/0039853 A1 | 2/2006 | Fan et al. | |
| 2006/0150665 A1 | 7/2006 | Weimer et al. | |
| 2006/0204425 A1 | 9/2006 | Kamijo et al. | |
| 2007/0149398 A1 | 6/2007 | Jones et al. | |
| 2007/0193254 A1 | 8/2007 | Johannes | |
| 2007/0243127 A1 | 10/2007 | Fedorov et al. | |
| 2008/0056972 A1 | 3/2008 | Iijima | |
| 2008/0112868 A1 | 5/2008 | Blencoe et al. | |
| 2008/0127632 A1 | 6/2008 | Finkenrath et al. | |
| 2008/0134660 A1 | 6/2008 | Finkenrath et al. | |
| 2008/0202339 A1 | 8/2008 | Nalette et al. | |
| 2008/0236117 A1 | 10/2008 | Zhang et al. | |
| 2008/0302104 A1 | 12/2008 | Hwang | |
| 2009/0019861 A1 * | 1/2009 | Heckt et al. | 62/3.2 |
| 2009/0038561 A1 | 2/2009 | Hago et al. | |
| 2009/0169452 A1 | 7/2009 | Constantz et al. | |
| 2009/0173073 A1 | 7/2009 | Guidati et al. | |
| 2009/0178387 A1 | 7/2009 | Schultz et al. | |
| 2009/0183697 A1 | 7/2009 | Inui | |
| 2009/0263296 A1 | 10/2009 | Taques | |
| 2009/0263316 A1 | 10/2009 | Iyer et al. | |
| 2009/0275120 A1 | 11/2009 | Koch et al. | |
| 2009/0282389 A1 | 11/2009 | Slone et al. | |
| 2009/0305388 A1 | 12/2009 | Dressler et al. | |
| 2009/0313997 A1 | 12/2009 | Bayley et al. | |
| 2009/0315489 A1 | 12/2009 | Karim et al. | |
| 2010/0024651 A1 | 2/2010 | Bansal | |
| 2010/0071559 A1 * | 3/2010 | Miachon et al. | 96/113 |
| 2010/0158776 A1 | 6/2010 | Drnevich et al. | |
| 2010/0172810 A1 | 7/2010 | Yi et al. | |
| 2011/0167798 A1 | 7/2011 | Evans-Beauchamp | |

FOREIGN PATENT DOCUMENTS

| | | |
|---|---|---|
| DE | 4140573 A1 | 6/1993 |
| EP | 1992799 A2 | 11/2008 |
| FR | 2875265 A1 * | 3/2006 |
| JP | 2006298707 A | 11/2006 |
| WO | WO 03029625 A1 * | 4/2003 |

OTHER PUBLICATIONS

Dubey et al., "Extraction of Carbon Dioxide From the Atmosphere Through Engineered Chemical Sinkage", Fuel Chem. Div. Preprints, 2002, 47(1), pp. 81-84.
International Search Report & Written Opinion mailed on May 21, 2012 in PCT/US2012/022008 filed Jan. 20, 2012.
Supplementary European Search Report & Opinion mailed Oct. 31, 2014 in EP 12736166 filed Jan. 21, 2012.
Office Action mailed Jul. 9, 2014 in U.S. Appl. No. 13/980,620, filed Aug. 29, 2013.
International Search Report & Written Opinion mailed May 25, 2012 in PCT/US2012/022058 filed Jan. 20, 2012.
Supplementary European Search Report & Opinion mailed Oct. 21, 2014 in EP12736182 filed Jan. 20, 2012.
Office Action mailed Nov. 26, 2014 in U.S. Appl. No. 13/980,453, filed Jul. 18, 2013.
International Search Report & Written Opinion mailed May 10, 2012 in PCT/US2012/022034 filed Jan. 20, 2012.
Supplementary European Search Report & Opinion mailed Jul. 23, 2014 in EP 12736347 filed Jan. 20, 2012.
International Search Report & Written Opinion mailed May 8, 2012 in PCT/US2012/022021 filed Jan. 20, 2012.
"How to Use Automotive Diagnostic Scanners" by Tracy Martin (2007), p. 72.
"Automotive Mechatronics: Operational and Practical Issues", vol. 1, by B. T. Fijalkowski (2010), pp. 151 and 162.
"Electronic Control Module Recalls", Auto Safety Org. website, pp. 1-3 (relevant portion on p. 3). (2013).

* cited by examiner

DIRECT DENSIFICATION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

FIELD OF THE INVENTION

The invention relates to the reduction of carbon dioxide emissions from the exhaust gas stream of vehicles powered by internal combustion engines and other heat engines that produce waste heat.

BACKGROUND OF THE INVENTION

The currently accepted thinking is that global warming is due to emissions of greenhouse gases such as carbon dioxide ($CO_2$) and methane ($CH_4$). About a quarter of global human-originated $CO_2$ emissions are currently estimated to come from mobile sources, i.e., automobiles, trucks, buses and trains that are powered by an internal combustion engine (ICE). This proportional contribution is likely to grow rapidly in the foreseeable future with the projected surge in automobile and truck ownership in developing countries. At present, the transportation sector is a major market for crude oil, and controlling $CO_2$ emissions is both an environmental responsibility and a desirable goal in order to maintain the viability of the crude oil market in the transportation sector in the face of challenges from alternative technologies, e.g., cars powered by electric motors and storage batteries.

Carbon dioxide management from mobile sources has many challenges including space and weight limitations, the lack of any economies of scale and the dynamic nature of the operation of the ICE powering the mobile sources.

Prior art methods for the capture of $CO_2$ from combustion gases have principally focused on stationary sources, such as power plants. Those that address the problem of reducing $CO_2$ emissions from mobile sources employ combustion using oxygen, provide no means for the regeneration and reuse of the $CO_2$ capture agent, and/or make no use of waste heat recovered from the hot source. Combustion using only oxygen requires oxygen-nitrogen separation which is more energy-intensive than separating $CO_2$ from the exhaust gases and the separation problem would be made even more difficult if attempted on board the vehicle.

The focus of $CO_2$ capture technology being on stationary, or fixed sources. The capture of $CO_2$ from mobile sources has generally been considered too expensive, since it involves a distributed system with a reverse economy of scale. The solution to the problem has appeared to be impractical due to on-board vehicle space limitations, the additional energy and apparatus requirements and the dynamic nature of the vehicle's operating cycle, e.g., intermittent periods of rapid acceleration and deceleration.

It is therefore an object of the present invention to provide a method, system and apparatus that addresses the problems of efficiently and cost-effectively reducing the $CO_2$ emissions from vehicles by temporary on-board storage of the $CO_2$. The capability for mass production of such systems will at least partially off-set other costs associated with the distributed nature of these mobile sources.

A further object of the invention is to provide systems and methods that are adapted to capture and store essentially pure $CO_2$ that would otherwise be discharged into the atmosphere from motor vehicles, so that it can be utilized in any of the many commercial and industrial processes for which $CO_2$ is required, or sent to a permanent storage site.

As used herein, the term "internal combustion engine", or ICE, includes heat engines in which a carbon-containing fuel is burned to produce power or work and generates waste heat that must be removed or dissipated.

As used herein, the term "mobile source" means any of the wide variety of known conveyances that can be used to transport goods and/or people that are powered by one or more internal combustion engines that produce an exhaust gas stream containing $CO_2$. This includes all types of motor vehicles that travel on land, airplanes and ships where the exhaust from the ICE is discharged into a containing conduit before it is discharged into the atmosphere.

The term "vehicle" as used herein is to be understood to be as a convenient shorthand and synonymous with "mobile source" and is coexistensive with "conveyances", generally, as that term is used above.

As used herein, the term "waste heat" is the heat that a typical engine produces which is contained mainly in the hot exhaust gases (~300°-650° C.) and the hot coolant (~90°-120° C.). Additional heat is emitted and lost by convection and radiation from the engine block and its associated components, and other components through which the exhaust gas passes, including the manifold, pipes, catalytic converter and muffler. This heat energy totals about 60% of the energy that typical hydrocarbon (HC) fuels provide.

As used herein, the term "heat recovery (HR) device" is any of a variety of devices which convert sensible heat to electrical energy or to mechanical work, e.g., movement that can be used to compress $CO_2$.

SUMMARY OF THE INVENTION

The above objects and other advantages are obtained by the present invention which broadly comprehends a method and system for on-board treatment of an exhaust stream containing $CO_2$ emitted by a hydrocarbon-fueled internal combustion engine (ICE) used to power a vehicle in order to reduce the amount of $CO_2$ discharged into the atmosphere which include:

a. a first waste heat recovery zone on board the vehicle for receiving the high temperature exhaust gas stream in heat exchange relation and discharging the exhaust stream at a lower temperature, the waste heat recovery zone further including at least one heat exchanger with an inlet for receiving the hot exhaust gas stream from the ICE for passage in heat exchange relation and an outlet for the cooled exhaust gas stream, the heat exchanger further including an inlet for receiving a heat exchange fluid at a first temperature and an outlet for discharging the fluid at a second higher temperature;

b. a densification zone in fluid communication with the exhaust gas stream discharge outlet from the first waste heat recovery zone, the densification zone including means for reducing the temperature and volume of the $CO_2$ to at least liquefy the $CO_2$, and to produce a treated exhaust gas stream of reduced $CO_2$ content;

c. a separation zone in communication with the densification zone and having a discharge outlet for the treated exhaust stream;

d. a storage zone for receiving the densified $CO_2$ for temporary storage on board the vehicle; and e. an exhaust gas conduit in fluid communication with the treated exhaust gas stream outlet from the separation zone.

In an alternative embodiment to the method and system described above, the heat exchange described in step (a) can be accomplished by passing the hot exhaust gases to one or more thermoelectric devices for direct recovery of the sensible heat and its conversion to energy, e.g., electricity, as will be described in more detail below. If multiple thermoelectric devices are employed, they can be operated in parallel at the same temperature or in series at successively lower temperatures. In this embodiment, the use of a heat exchanger becomes optional and can be omitted.

The invention provides a method and system for direct densification and separation of substantially pure $CO_2$ from the engine exhaust gases and temporary storage of the densified $CO_2$ on board the vehicle for later use in any of a wide variety of known commercial and industrial uses, or for transportation to a permanent storage site. All or part of the energy requirements for the densification step are derived from the engine's waste heat, which can include the exhaust gas stream, the engine's cooling system, and the engine block and associated metal components. The environmental advantages of the invention are apparent.

Figure 1:
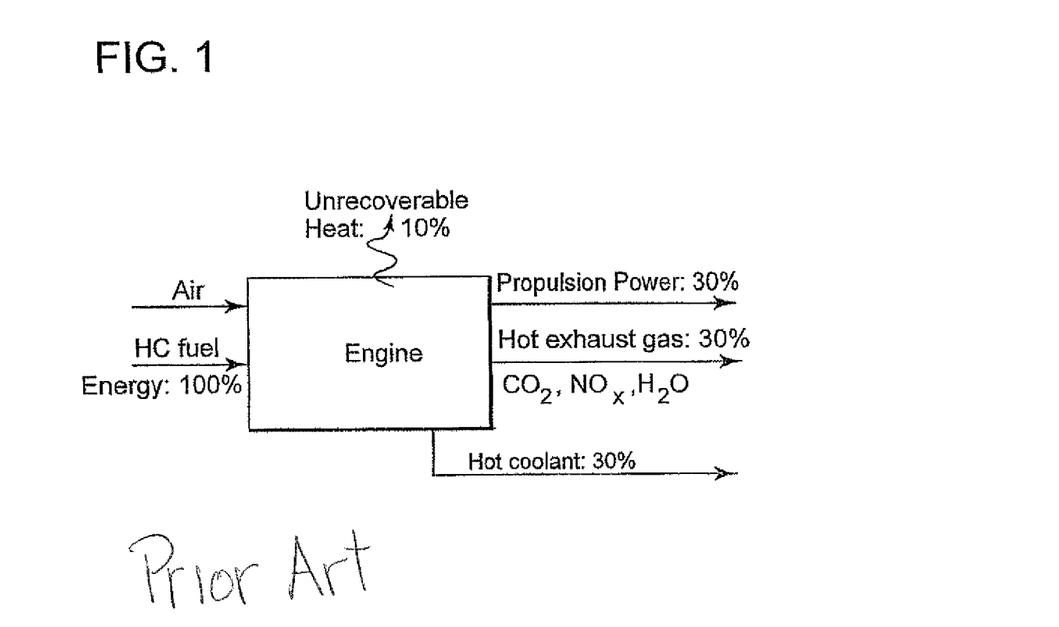
FIG. 1 is a schematic illustration of the conversion of hydrocarbon fuel energy to heat and power by a typical internal combustion engine as determined in the prior art.

The method and system of the invention integrate various components for efficient post-combustion $CO_2$ capture by densification and temporary on-board storage using waste heat generated by the combustion of the hydrocarbon fuel used to power the vehicle. As noted above, the waste heat that a typical engine produces totals about 60% of the energy that typical hydrocarbon (HC) fuels provide. This energy is contained mainly in the hot exhaust gases (~300-650° C.) and the hot coolant (~90°-120° C.) as shown in FIG. 1. Additional heat is also emitted and lost by convection and radiation from the engine block and its associated components, and other components through which the exhaust gas passes, including the manifold, exhaust pipes, catalytic converter and muffler.

Energy is needed to separate the $CO_2$ from the exhaust gases and to compress and liquefy or freeze all or part of the produced $CO_2$ for efficient on-board storage. This energy is usually a mix of work and heat energies. The work component of the energy is generated by using part of the waste heat to produce this work.

During startup of the $CO_2$ densification cycle, or for a special need, part of the engine power, or the electricity stored in on-board batteries can be used to provide all or a portion of the work/energy requirements. During normal operations, at least a portion of the energy required for densification and capture will come from the waste heat.

The $CO_2$ separation from the exhaust gases is effected by a phase change of the gaseous $CO_2$ to form a liquid or solid that can readily be separated from the gaseous nitrogen, water vapor and any remaining $CO_2$. The densification of $CO_2$ for efficient temporary onboard storage is accomplished by compression, liquefaction and/or freezing, e.g., to form dry ice, with a final density in the range of 460-1600 kg/m3. Part of or all of the work energy required for the densification step is derived from the heat normally lost to the atmosphere by using heat-to-power conversion devices that are selected on the basis of the specific requirements of the system and operating environment. Methods for effecting this phase change are known in the field. The specific use in the limited volume available on board mobile sources requires the analysis of various interrelated factors. Additionally, the present invention includes the option of a controlled discharge of all or a portion of the exhaust gas stream into the atmosphere without passing the stream through the first waste heat recovery zone.

Capturing $CO_2$ by phase change requires cooling, compression and/or refrigeration. The latter two process steps can be accomplished in part or in full by utilizing energy associated with the recovery of waste heat. Internal cooling can be achieved relatively easily by expansion of compressed gases. Specifically, the $CO_2$ can be compressed, while removing heat from the compressor and/or gas transport conduits by heat exchange, and followed by expansion of the compressed $CO_2$ to effect a phase change of all or a part of the $CO_2$.

As previously noted, in accordance with the process of the invention, the $CO_2$ is separated from the exhaust gas stream by cooling, compression and/or refrigeration to form either a liquid or a solid (dry ice). At ambient temperatures, $CO_2$ can exist as a liquid. The critical point of $CO_2$ is 31° C. and 73 bar. The freezing point of the liquid to form the solid dry ice is ~78° C. Thus, freezing requires much greater temperature reduction, but the density is high at about 1.4 to 1.6 g/cm3, thereby reducing the space required to store the $CO_2$ on board until refueling and/or delivery to an appropriate receiving facility.

The energy requirements for refrigeration can be derived from the processes that are described below.

1. A compression refrigeration cycle in which the mechanical energy needed for compression is obtained from a heat recovery (HR) unit that converts waste heat into electricity or mechanical work. In addition, some of the mechanical energy is recovered by expanding the $CO_2$ exhaust gas that is discharged into the atmosphere.
2. The waste heat is supplied directly to an adsorption or absorption refrigeration cycle, which cycle has no moving parts and, therefore, does not drain any of the work from the engine's power train.
3. The use of subsonic or supersonic nozzles for rapid expansion and cooling of the exhaust gas that will result in the precipitation of the $CO_2$ in liquid or solid form for collection and temporary on-board storage.

Partial compression can be achieved by passing the exhaust gas through a turbocharger, thus recovering some of the flow energy of the exhaust gas stream.

The present invention solves the problems of space limitations and auxiliary power requirements by using the free energy that is available on board the vehicle as waste heat to densify at least a portion of the $CO_2$ to thereby significantly reduce its volume for temporary storage until it can be removed from the vehicle and recovered at a refueling or other appropriate facility. The invention includes (a) a cooling and separation method to remove all or a substantial portion of the $CO_2$ from the engine exhaust gases; (b) the recovery of substantially pure $CO_2$ using some of the engine waste heat; (c) conversion of some of the engine's waste heat into power, i.e., work energy; and (d) the use of this power, if necessary, to further increase the density of the $CO_2$ for temporary on-board storage. The use of the waste heat to provide the energy for capture by densification simplifies the process of separating the $CO_2$ from the nitrogen in the exhaust stream, significantly reduces the cost, and the densification reduces the volume requirement for temporary on-board storage of the $CO_2$.

The invention further comprehends the optional use of some portion of the engine's work to operate one or more compressors. The engine's work can be utilized when the engine is operating in the deceleration mode and would serve to slow the engine, and when the engine is idling. An on-board processor and controller can be utilized to engage the $CO_2$ compressor drive link to the engine at appropriate predetermined engine operating conditions.

The invention can be used on a wide range of mobile sources such as passenger vehicles, trucks, buses, heavy-duty vehicles, train, ships, planes and the like that operate through the combustion of fossil-based, or hydrocarbon fuels. The system and apparatus of the invention can be installed on new mobile sources and/or by retrofitting existing mobile sources.

The present invention is based on the integration of various components to form a system for efficient post-combustion $CO_2$ densification and subsequent temporary storage on board the conveyance using waste heat recovered from the vehicle's ICE. The system can include (a) a first heat exchange zone to recover a portion of the waste heat and associated energy and to thereby reduce the temperature of the $CO_2$ and other constituents of the engine exhaust gas stream; (b) a conversion zone where some of the waste heat is converted into power (work energy); and (c) a densification zone where power derived from the waste heat is employed to increase the density of the captured $CO_2$ for temporary on-board storage. In the practice of the method of the invention, all or a substantial portion of the energy requirements to operate the system come from the engine waste heat.

At least a part of the total work energy required for the densification is obtained from the waste heat by using heat-to-power conversion. In an embodiment of the invention, a portion of the densified $CO_2$ will be maintained and stored as a liquid and another portion is in solid form. During start-up of the $CO_2$ capture cycle, or to meet a requirement of other special operational needs, part of the engine's power or, alternatively, the electricity stored in on-board batteries can be used. During the normal steady-state operation of the system, at least a portion of the energy required for $CO_2$ densification and capture will come from the ICE's waste heat.

One advantage possessed by the present invention over prior art processes for reducing $CO_2$ emissions from fixed sources is the ready availability of relatively high to moderate temperature fluids containing waste heat. The cost of the heat energy is a major item of expense for $CO_2$ capture from fixed sources because the temperature of the flue gases from a coal- or gas-fired electrical generation facility is greatly reduced in order to maximize the energy values of the fuel and minimize the discharge of pollutants such as $SO_x$ and waste heat into the environment.

BRIEF DESCRIPTION OF THE DRAWINGS

The invention will be further described below and with reference to the attached drawings in which the same or similar elements are identified by the same number, and in which.

DETAILED DESCRIPTION OF THE INVENTION

Figure 2:
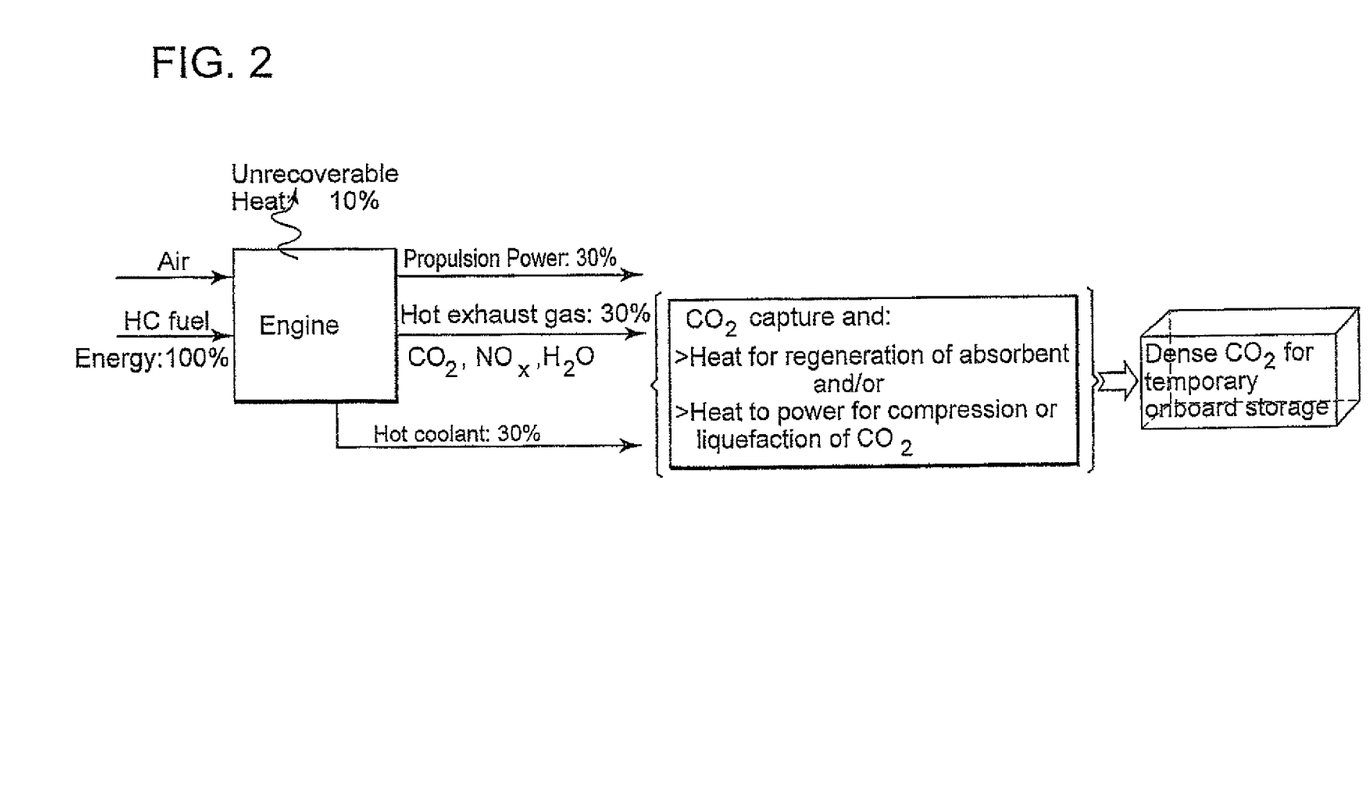
FIG. 2 is a schematic diagram that incorporates FIG. 1 and illustrates the method of the present invention.

The schematic illustration of FIG. 2 provides an overview of the direct densification method of the invention for the separation by liquification and/or solidification of the $CO_2$ in the exhaust gas stream in which waste heat energy from the fuel's combustion is converted to other forms to effect the densification.

Figure 3:
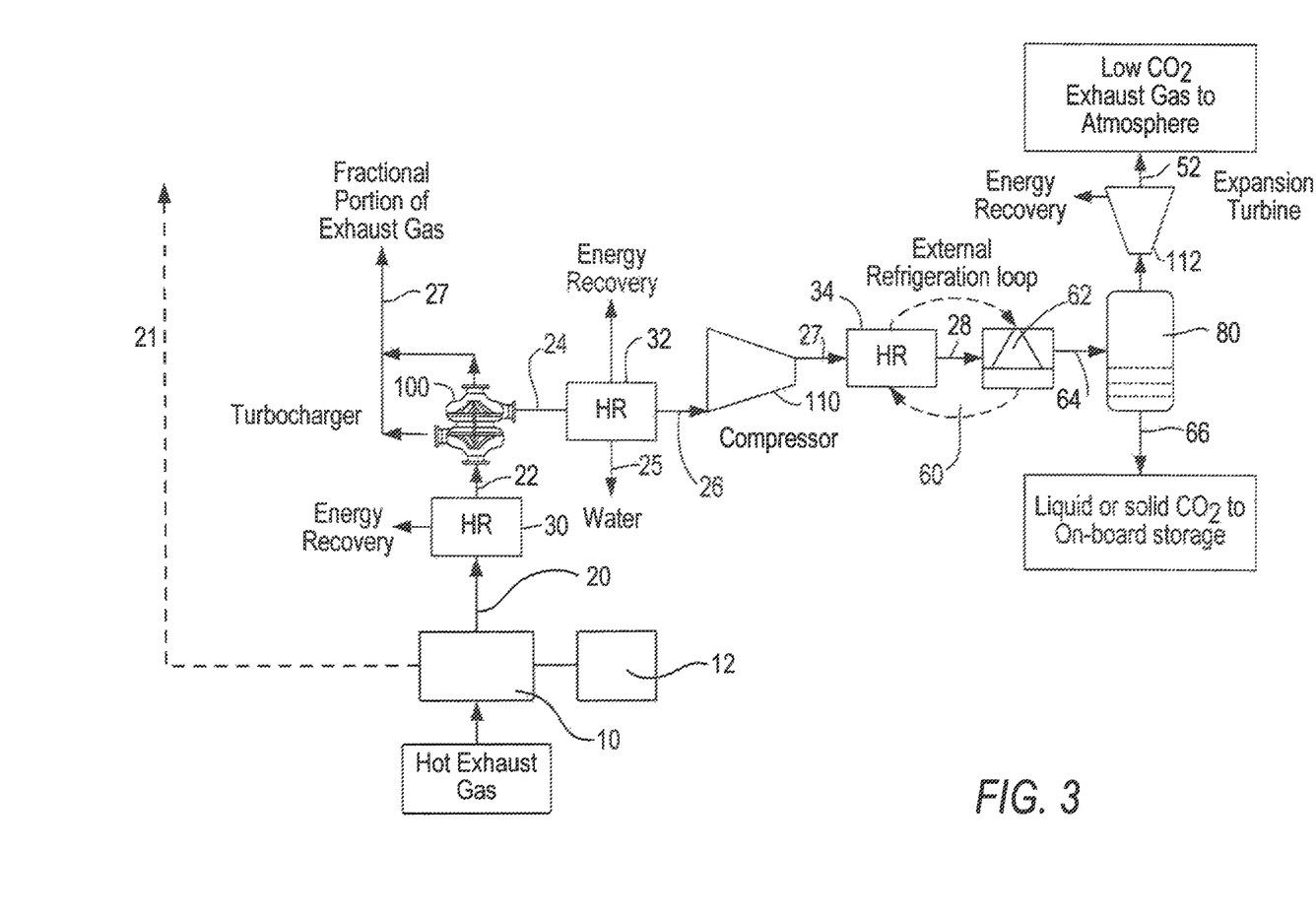
FIG. 3 is a schematic illustration of one embodiment of the method and apparatus employed in the system of the present invention.
Figure 4:
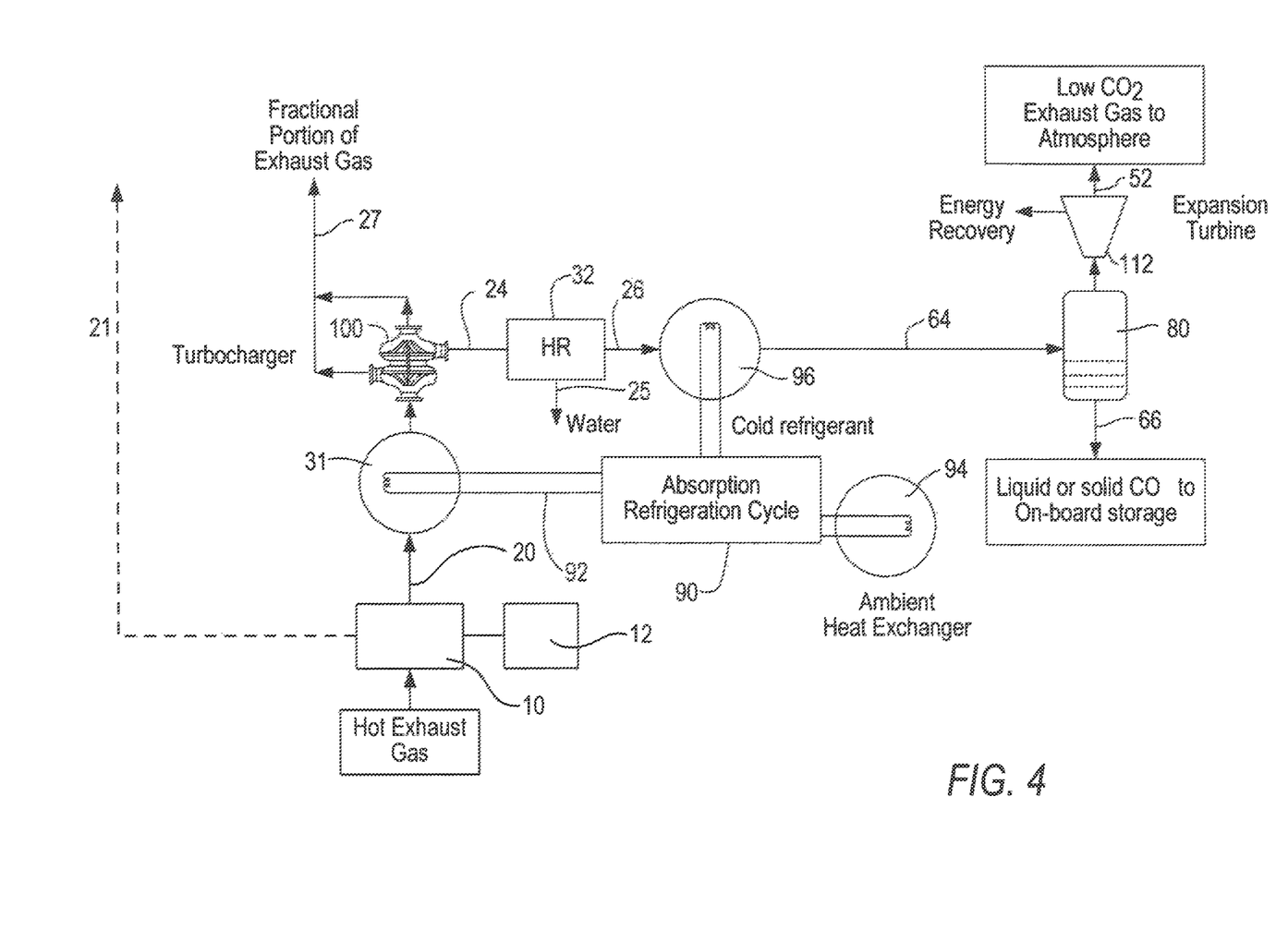
FIG. 4 is a schematic illustration of another embodiment of the method and apparatus employed in the system of the present invention.
Figure 5:
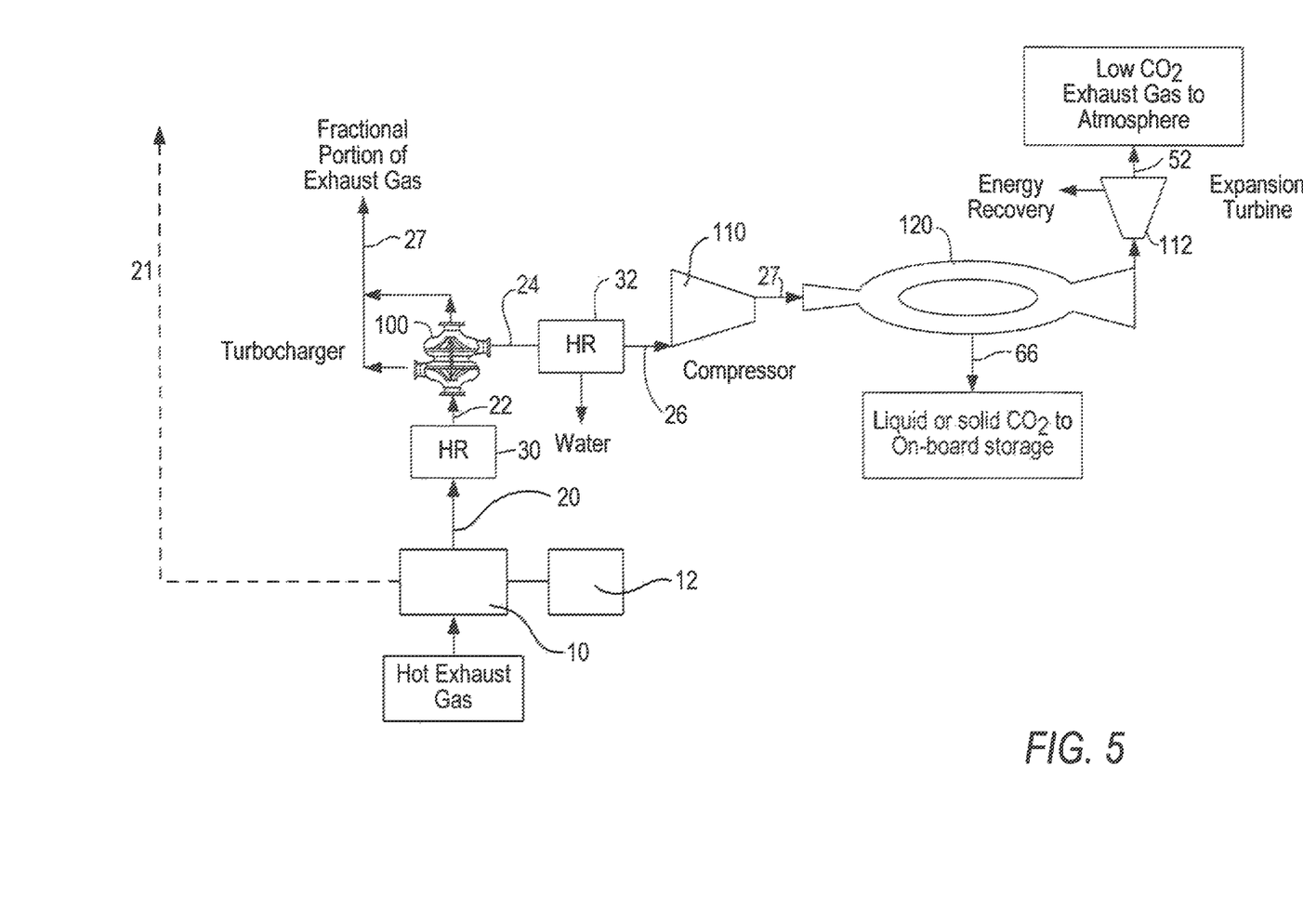
FIG. 5 is a schematic illustration of a further embodiment of the method and apparatus employed in the system of the present invention.

Three specific embodiments of the invention are also schematically illustrated in FIGS. 3-5. FIG. 3 illustrates the compression-based process. A diverter valve 10, controlled by an engine management control unit 12, controls the flow of the hot exhaust gas 20. All or a portion of the hot exhaust gas stream 20 passes through a first heat recovery (HR) unit 30 that operates at high temperatures (400°-650° C.) to convert some of the waste heat into electrical or mechanical energy that is recovered for use in the system. The cooled exhaust gas stream 22 is then optionally passed to turbocharger 100 to increase its pressure and also to split the exhaust gas stream, where a fractional portion 24 is processed for $CO_2$ densification and the remainder 27 is discharged directly into the atmosphere. This optional split is principally determined based on the exhaust gas stream flow rate in relation to the energy available for $CO_2$ densification and on-board storage. Optionally, all or a portion of the hot exhaust gas stream 20 may undergo a controlled discharge directly into the atmosphere via discharge 21.

The compressed exhaust gas stream 24 then passes through a second heat recovery unit 32 that operates at a lower temperature than the prior HR 30. The majority of the condensable water vapor present is removed as a liquid stream 25, and additional waste heat is converted into electrical or mechanical energy. The cooled gas then goes to a compressor 110 to increase its pressure to a point where further processing will yield liquid or solid $CO_2$. This compression step at 110 will raise the temperature of the exhaust gas stream, so that its passage through a third heat recovery unit 34 recovers additional electrical or mechanical energy. Heat recovery unit 34 also functions as a part of a small external refrigeration cycle 60. The exhaust gas stream 28 that has been cooled in HR unit 34 then passes through a throttling valve 62, where it is quickly cooled and all or a portion of the $CO_2$ condenses to the liquid or solid phase and passes as stream 64 to separation vessel 80. Nitrogen does not condense under these operating conditions, since it has a much lower critical point of 126° K. The condensed $CO_2$ 66 is separated from the remaining gases, which are principally nitrogen and some uncondensed $CO_2$ in a separation vessel 80. The $CO_2$ has thus been directly densified and simultaneously separated from the remaining exhaust gases. The nitrogen and other gases are passed through a turboexpander, or expansion turbine 112 in which the high pressure gas is expanded and impinges on the blades to cause the turbine shaft to rotate. Following extraction of the mechanical work, the remaining exhaust gas stream 52 of reduced $CO_2$ content is discharged to the atmosphere. The energy required to run compressor 110 can be supplied by the heat recovery devices and/or the expansion turbine 112.

FIG. 4 is a schematic diagram illustrating the absorption refrigeration cycle-based process. This process employs a refrigeration unit 90 that operates based on a high-temperature heat source and a low temperature heat sink. The hot exhaust gas stream 20 provides the high temperature heat source which contacts refrigerant 92 in heat exchanger 31 and the temperature differential between it the ambient air heat exchanger 94 is generally sufficient to provide the low temperature heat sink for the operation of the refrigeration unit 90. The turbocharger 100 and the heat recovery unit 32 function in the same manner as was described above in conjunction with FIG. 3. The cold refrigerant zone 96 is used to lower the temperature of the cooled exhaust gas stream 26 to a temperature at which liquid or solid $CO_2$ 64 is formed. As previously noted, nitrogen does not condense at these operating conditions due to its much lower critical point. The condensed $CO_2$ product stream 64 is passed to separation vessel 80 where it is separated from the remaining exhaust gases which, following an optional expansion step in the turboexpander 112 to generate additional energy, are released to the atmosphere as stream 52.

FIG. 5 is a schematic diagram illustrating the direct densification process using a rapid expansion nozzle. Following the compression step described above in connection with FIG. 3 for the compression-based process, the exhaust gas stream 27 exiting compressor 110 is passed to a rapid expansion nozzle 120, where it swirls, expands and cools to form a condensed $CO_2$ phase which is collected as densified $CO_2$ product 66 from below the nozzle discharge. The remaining uncondensed gases can optionally be subjected to an expansion step to recover energy from turboexpander 112, before being discharged to the atmosphere as $CO_2$ reduced exhaust stream 52. As will be understood by one of ordinary skill in the art, this process is based on existing and well known principles for reducing the temperature and expanding the volume of a gas to directly separate the $CO_2$ from the other exhaust gas constituents based upon their respective well-defined physical characteristics.

These examples also illustrate alternative locations for the heat recovery (HR) components which convert heat to work or electrical power that can be used to operate the densification apparatus of the system and other auxiliary equipment, such as automated valves, pressure and temperature sensors, and controllers.

The size or capacity, location and operating conditions of the HR components are determined based upon the availability of waste heat, e.g., from the engine exhaust stream. This will include both temperature and the volumetric flow rate of the waste heat stream, whether it be the exhaust or engine coolant. A single or more than one type of heat recovery component can he employed depending upon the nature of the waste heat stream and its temperature and flow conditions. Additionally, a diverter valve is controlled by any conventional engine management control (EMC) unit based on the operating conditions of the ICE. EMC units are well known to those of ordinary skill in the art. Some of the heat recovery units can optionally be replaced with heat exchangers to cool the gas stream if the efficiency of heat conversion to work or electricity is not sufficient, as may occur when the temperature of the gas stream is not high enough. The substitution of heat exchange devices will provide equipment cost savings.

The operation of the heat/energy recovery system can be controlled by a pre-programmed processor and controller that receives data from temperature and flow sensors, and that is in controlling communication with flow-regulating valves. The exhaust gas having a lower temperature can then exchange further heat with a thermoelectric device to produce electricity. Finally, the exhaust gas of relatively lower temperature can be introduced into the adsorbent zone for reduction of its $CO_2$ content before being discharged into the atmosphere.

The exhaust gas stream from a gasoline or diesel fueled ICE contains about 13% water vapor. The water vapor will condense to form a liquid during the early stages of the densification process and can be removed from the process by methods and apparatus that are well known in the art. The water can be discharged into the atmosphere in liquid form, or passed into contact with a hot surface to convert it back into vapor form and used to run a small steam turbine for additional power. In any event, substantially all of the water vapor will be discharged into the atmosphere alone or with the nitrogen and any remaining $CO_2$ in the lean exhaust gas stream.

It is preferable that the $CO_2$ be removed from exhaust gases downstream of the catalytic converter on vehicles that are so equipped. This is because the exhaust will have less contaminants that could adversely effect the densification process. In addition, when the engine is cold at start-up, the exhaust gas downstream of the catalytic converter will be hotter than upstream due to the exothermic reactions that occur in the converter.

In an embodiment, the $CO_2$ densification is performed by a single or multiple stage compressor with an appropriate active/passive cooling system to ensure pressurization for compression and liquefication or solidification of $CO_2$ for the temporary on-board storage. The $CO_2$ can be stored in a single tank or in multiple tanks on board the mobile source. The fuel tank can also be used to store the densified $CO_2$ by having a moving partition between the fuel side and the $CO_2$ storage side.

Heat management and control is required to assume the efficient operation of the system. Heat is removed from the hot exhaust gases by the heat recovery devices. Heat is supplied to other component(s) to provide the required heat for electrical generation or work. Supply and removal of heat can be accomplished using different methods including conduction, convection, radiation and/or a combination of these methods. Control of all of the system components can be integrated with the mobile source's control system or a separate control system to optimize performance.

In the case of conduction, heat is supplied or removed using a thermal conducting material, such as metal. If the exhaust gases are passed through tubes, the heat can be removed from the outside of the tubes using conduction through the tube shell. Fluids can be used to supply or remove the heat from the outer shell of the tubes. Fins, metal mesh inside the tubes and other designs and known techniques are used to increase the surface area in contact with the hot gases and enhance the heat transfer. Fins and other surface changes can also be used on the outer shell of the tube to enhance the heat transfer of the system. The $CO_2$ exhaust gases can also be passed over the outside of tubes and the inside of the tube used to supply or remove the heat transfer fluids.

In general, commercially available plate-type compact heat exchangers have been found to be effective in reducing the temperature of the exhaust gas stream. They are available in a variety of sizes and materials of fabrication. The large heat transfer surface permits use of a relatively smaller device, saving both on volume and weight added to the vehicle.

FIGS. 3 and 4 identify locations for placement of HR components. Single or multiple technologies can be used to convert the waste heat to electrical energy or work to compress the $CO_2$ and power the auxiliary equipment.

The type of heat recovery (HR) component(s) used in the practice of the invention include, but are not limited to the following types of apparatus.

1. Thermoelectric devices used to convert the waste heat to electrical energy can be placed in different locations and arrangements to optimize the energy conversion. The thermoelectric devices are secured in heat conductive contact with the exhaust pipe, capture components, engine block or other engine components as the hot side of the device. The cold side, or leg, of the thermoelectric device is exposed to air convection to cool the device. The cold side of the thermoelectric device can also be in contact with an active cooling system, e.g., a circulating liquid, to facilitate heat transfer and also control the thermoelectric module's performance.

The hot side, or leg, of the thermoelectric module is installed on the exhaust gas side and the cold side is installed in a closed cooling system referred to as an active system or exposed to air as a passive system. The thermoelectric module(s) remove part of the heat from the hot side and generate electrical power that can be used to operate the densification apparatus and/or other on-board equipment.

The thermoelectric devices can assume different shapes such as cylindrical or rectangular pipes to minimize the pressure drop effects on the exhaust gases. Internal and/or external fins can also be used to enhance the heat transfer of the thermoelectric devices and hence their performance. Thermoelectric devices can be mounted very close to, or on the engine block to make use of the high temperatures. Appropriate materials are selected to withstand the high temperatures.

2. Electrical power generated using thermoelectric module(s) is supplied to an electrical storage system, e.g. batteries, which in turn supply the electrical power to the densification apparatus and/or other equipment.

Selection of the semiconductors for the thermoelectric module(s) is based upon the temperature range of the application. Stacking of different thermoelectric devices optimizes the heat recovery and hence the electrical energy generation.

3. A Stirling engine is employed in which the waste heat from the ICE exhaust is supplied to the wall of one or more cylinders of the engine to expand the gas in the cylinder to thereby drive a piston that performs the necessary mechanical work to run the densification compressor or to run the compressor of a compression refrigeration cycle unit that provides cold refrigerant to liquefy or solidify the $CO_2$.

4. A steam generator is employed to provide steam to a turbine which generates mechanical work to run the densification compressor or to run the compressor of a compression refrigeration cycle unit that provides cold refrigerant to liquefy or solidify the $CO_2$.

5. A small shape memory alloy engine or compressor utilizes the waste heat to change the shape of an alloy (such as CuSn, InTi, TiNi, and MnCu) and generates mechanical work that is used to increase the density of the captured $CO_2$. The engine compressor works by having a hot side and a cool side of the alloy to generate the compression needed. The following patents describe heat engines based on these types of unusual alloys: U.S. Pat. Nos., 3,913,326; 4,055,955; 5,442,914; 7,444,812; and published application 2009/0315489. The disclosures of these patent documents are incorporated herein by reference.

6. Single or multiple heat recovery systems are installed on the exhaust gas and coolant systems.

7. Single or multiple heat recovery systems are installed to generate the required power and effectively reduce the temperature of the exhaust gases and thereby reduce the downstream energy required to compress, liquefy and/or solidify the $CO_2$.

In a further embodiment of the present invention, a portion of the $CO_2$ that is recovered after regeneration of the capture agent is returned via a suitable conduit to the air intake of the engine to be mixed with the atmospheric air and fuel. This aspect of the system operation is similar to the known methods for exhaust gas recirculation (EGR) that is currently used to reduce engine operating temperatures and thereby to reduce the amount of $NO_x$ compounds produced during the burning of the fuel. An amount of $CO_2$ equivalent to from 5 to 15 percent of the exhaust gas volume can be returned to the intake. Return of the $CO_2$ also reduces the amount of atmospheric nitrogen drawn in with the fuel mixture, which also has the beneficial effect of reducing the $NO_x$ compounds in the exhaust. The percent of $CO_2$ in the exhaust gas stream is also increased, thereby enhancing recovery.

Recirculation of $CO_2$ can be implemented by the same devices and control systems conventionally employed for exhaust gas recirculation on motor vehicles. The recirculation of $CO_2$ can also be undertaken in conjunction with existing EGR systems. The $CO_2$ can replace all or a predetermined portion of the exhaust gas based upon the engine operating conditions or, in accordance with current practices, discontinuing recirculation entirely such as at start-up when the engine is cold, or during rapid acceleration and/or when the ICE is under a heavy load.

In a further embodiment of the invention, a portion of the $CO_2$ recovered directly from the exhaust gas stream or the densified storage container is mixed with water and catalytically reacted using known methods to form methane and water by the interim reaction of hydrogen and carbon monoxide that are formed in situ. The methane and water are then used to supplement the conventional hydrocarbon fuel supplied to the engine intake. The water reacted with the $CO_2$ can be recovered from the exhaust gas stream or from a separate on-board source provided for that purpose.

Another advantage of the method and system of the present invention is the availability of pressurized $CO_2$ on board the vehicle for use in the vehicle's air conditioning system. The $CO_2$ is used in place of man-made hydrofluorocarbon chemicals and refrigerants of the Freon type which have been shown to pose risks for harming the environment.

The present invention addresses post-combustion $CO_2$ capture and on-board storage from mobile sources. To minimize operational cost and equipment requirements, the available heat, which is conventionally discharged into the atmosphere, is used to the maximum amount practical to provide the energy needed to separate the $CO_2$ from the combustion gases by compression to liquefy and/or solidify all or part of the produced $CO_2$ for efficient on-board storage. The $CO_2$ so captured can be stored on board until refueling, when it can be discharged or removed for recovery at the fueling station. The apparatus of the invention is easier to deploy on board as compared to methods that have been proposed that involve chemical reactions, such as reforming, or major changes in engine design, such as by providing cylinder walls that are permeable to $CO_2$.

Although various embodiments of the invention have been described above and in the attached drawings, other modifications and variations will be apparent to those of ordinary skill in the art from this description, and the scope of the invention is to be determined by the claims that follow.

The invention claimed is:

1. A method for reducing the amount of $CO_2$ discharged into the atmosphere with the exhaust gas stream emitted by a hydrocarbon-fueled internal combustion engine (ICE) used to power a vehicle, the method comprising:

a. introducing the hot exhaust gas stream into a first waste heat recovery zone on board the vehicle and passing the high temperature exhaust gas stream in heat exchange relation with a least one heat recovery device that converts waste heat into electricity and/or mechanical work and/or heat exchanger and discharging the exhaust stream from the waste heat recovery zone at a lower temperature, b. introducing the cooled exhaust gas stream from the first waste heat recovery zone into a densification zone and densifying the $CO_2$ by reducing the temperature and volume of the $CO_2$ utilizing the electricity and/or mechanical work produced by the recovery device, and producing a treated exhaust gas stream of reduced $CO_2$ content;

c. separating the densified $CO_2$ and the remaining treated exhaust stream in a separation zone;

d. discharging the treated exhaust stream from the separation zone; and e. maintaining the densified $CO_2$ in a storage zone for temporary storage on board the vehicle.

2. The method of claim 1 which operates continuously following start-up of the vehicle's ICE.

3. The method of claim 1 in which the densified $CO_2$ in step (b) is either a liquid or a solid.

4. The method of claim 1 in which the at least one heat recovery device is selected from the group consisting of a thermoelectric device, a thermoelectric module, a Stirling engine, a steam generator and associated turbine, a shape memory alloy engine, and combinations thereof.

5. The method of claim 1 in which the $CO_2$ content of exhaust gas stream is reduced by at least 5%.

6. The method of claim 1 in which ambient air is passed through the at least one heat recovery device and/or heat exchanger in the waste heat recovery zone.

7. The method of claim 1 which includes cooling ambient air prior to passing the air through the at least one heat recovery and/or heat exchanger in the waste heat recovery zone.

8. The method of claim 1 which includes recycling a portion of the $CO_2$ recovered from the exhaust gas stream to the ICE.

9. The method of claim 1 in which at least a portion of the electricity and/or mechanical work produced by the heat recovery device and/or heat exchanger is used to power auxiliary electrical and/or mechanical systems on board the vehicle.

10. The method of claim 1 in which a portion of the $CO_2$ recovered from the exhaust gas stream is utilized as a refrigerant gas in an air conditioning apparatus on board the vehicle.

11. The method of claim 1, which includes converting heat into electricity and/or mechanical work by contacting hot coolant in heat exchange with at least one thermoelectric device.

12. The method of claim 1, where the ICE is configured with an engine block and associated manifold, exhaust pipe, catalytic converter and muffler through which the hot exhaust gas stream passes, and the process includes converting heat into electricity and/or mechanical work by securing at least one thermoelectric device in heat conductive contact with one or more of the engine block, the manifold, the exhaust pipe, the catalytic converter and the muffler.

13. A system for on-board treatment of an exhaust gas stream containing $CO_2$ emitted by a hydrocarbon-fueled internal combustion engine (ICE) used to power a vehicle in order to reduce the amount of $CO_2$ discharged into the atmosphere, the system comprising:

a. a first waste heat recovery zone on board the vehicle for receiving the high temperature exhaust gas stream in heat exchange relation and discharging the exhaust stream at a lower temperature, the waste heat recovery zone including at least one heat exchanger with an inlet for receiving the hot exhaust gas stream from the ICE for passage in heat exchange relation and an outlet for the cooled exhaust gas stream, the heat exchanger including at least one heat recovery device that converts waste heat into electricity and/or mechanical work, the heat exchanger further including an inlet for receiving a heat exchange fluid at a first temperature and an outlet for discharging the fluid at a second higher temperature;

b. a densification zone in fluid communication with the exhaust gas stream discharge outlet from the first waste heat recovery zone, the densification zone including apparatus for reducing the temperature and volume of the $CO_2$ utilizing electricity and/or mechanical work produced in step (a), and producing a treated exhaust gas stream of reduced $CO_2$ content;

c. a separation zone in communication with the densification zone and having a discharge outlet for passage of the treated exhaust stream;

d. a storage zone for receiving the densified $CO_2$ for temporary storage on board the vehicle; and e. an exhaust gas conduit in fluid communication with the treated exhaust gas stream outlet from the separation zone.

14. The system of claim 13 which includes a diverter valve for regulating the volumetric amount of the exhaust gas stream which passes into the first waste heat recovery zone for treatment.

15. The system of claim 14 in which the diverter valve is controlled by an engine management control unit based on the operating conditions of the ICE.

16. The system of claim 14 in which the diverter valve is controlled based upon the capacity of the apparatus in the densification zone to liquefy or solidify the $CO_2$.

17. The system of claim 13 in which the apparatus in the densification zone is selected from the group consisting of a fluid-cooled compressor and a refrigeration unit, and a combination thereof.

* * * * *